United States Patent

[11] 3,592,537

[72] Inventors: Tokusaburo Kakiuchi; Hideaki Akiyama, both of Tokyo, Japan
[21] Appl. No. 828,192
[22] Filed: May 27, 1969
[45] Patented: July 13, 1971
[73] Assignee: Kabushiki Kaisha Ricoh, Ota-ku, Tokyo, Japan
[32] Priority: June 3, 1968
[33] Japan
[31] 43/46369

[54] CARTRIDGE-TYPE CINE-PROJECTOR
3 Claims, 2 Drawing Figs.

[52] U.S. Cl. .................................................. 352/72, 350/123, 352/104
[51] Int. Cl. .................................................. G03b 21/10, G03b 23/02
[50] Field of Search .......................................... 352/72–78, 104, 129; 350/123; 353/18, 47, 50, 74, 77, 79

[56] References Cited
UNITED STATES PATENTS

| 2,455,187 | 11/1948 | Owens | 352/78 X |
| 2,583,467 | 1/1952 | Burleigh et al. | 350/123 |
| 2,730,011 | 1/1956 | Kleinhample et al. | 350/123 |
| 3,284,155 | 11/1966 | Jensen et al. | 352/72 X |
| 3,464,765 | 9/1969 | Broeckl et al. | 352/72 |

Primary Examiner—Louis R. Prince
Assistant Examiner—Joseph W. Roskos
Attorney—Burgess, Ryan and Hicks ABSTRACT: A cartridge-type cine-projector having on its front panel a screen and a separate opening having wall means that slant inwardly toward the screen at an angle of about 50°. A film cartridge having an included light source reflecting mirror is insertable into said opening and an image from the film is projected onto an angled mirror mounted rearwardly from the screen so that the image reflected from the angled mirror appears on the screen.

PATENTED JUL 13 1971  3,592,537

INVENTORS
TOKUSABURO KAKIUCHI
HIDEAKI AKIYAMA
BY
Burgess, Ryan & Hicks
ATTORNEYS

3,592,537

CARTRIDGE-TYPE CINE-PROJECTOR

BACKGROUND OF THE INVENTION

The present invention relates to a cartridge-type cine-projector and more particularly a cartridge-type cine-projector of the type having a projection screen incorporated at the front panel thereof.

The cartridge-type 8mm. and 16mm. projectors in which cartridges having a length of film loaded therein are detachably mounted in the projectors for facilitating the easy operation have been widely used recently. Furthermore, the projectors of the type in which one projector and one screen are incorporated in one housing or cabinet so that the picture may be viewed through the projection screen have found wide uses in offices, homes and schools for audio/visual education. However, the erect picture is projected upon the screen through a complicated optical system including a relatively large number of reflecting mirrors or prisms. Therefore, the cine-projectors of the type described are complicated in construction, tedious in assembly and adjustment and expensive in cost and the loss of the intensity of projection light is larger because of the image projection light is reflected by the reflecting mirrors or prisms many times while the sharpness of the projected image is somewhat deteriorated because of the insufficient optical flatness of the reflecting surface of the reflecting mirror or prisms.

However, there has not been proposed a cine-projector of the type described which can eliminate such defects as described above.

SUMMARY OF THE INVENTION

In brief, the present invention provides a cine-projector incorporating a projection screen in its front panel and utilizing a film cartridge in which the film cartridge is loaded in the projector at an angle from 45° to 55° relative to the front panel of the projector and the erect image of the film is projected upon the screen through a simple optical system consisting of a projection lens and a single reflecting mirror. A projection light source is located transversely of the cartridge and the light emanated from the light source illuminates the film through an opening formed in the cartridge in opposed relation with the light source and a reflecting mirror for illumination within the cartridge.

It is preferable that the rear portion, that is the portion of the cartridge where the supply reel is disposed, is extended beyond the projector when loaded because when the cartridge is made of a transparent material the amount of the film still wound around the supply reel may be readily seen. Furthermore, this arrangement is suitable for inserting or detaching the cartridge.

One of the objects of the present invention is to provide a cartridge-type cine-projector which can minimize the loss of the intensity of projection light.

Another object of the present invention is to provide a cartridge-type cine-projector simple in construction, light in weight, easy to operate and inexpensive to manufacture.

The above and other objects, features and advantages of the present invention will become more apparent from the following description taken in conjunction with the accompanying drawing.

DESCRIPTION OF THE PREFERRED EMBODIMENT

Figure 1:
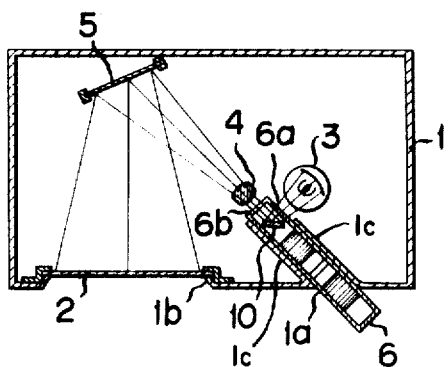
FIG. 1 is a transverse sectional view of one embodiment of the present invention.
Figure 2:
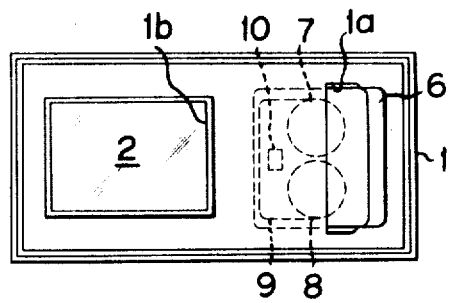
FIG. 2 is a front view thereof.

In the front panel of the projector 1 is formed a film cartridge inserting opening 1a having wall means 1c that slant inwardly at an angle from 45° to 55° toward a transparent projection screen 2 that is securely attached in an opening 1b formed in the front panel. Within the projector is disposed a reflection type projection lamp 3, a projection lens 4 and a plane-reflecting mirror 5 stationarily held in position as shown in FIG. 1.

Supply and takeup reels 7 and 8 are rotatably disposed within a film cartridge 6 and a film 9 is extending between the reels 7 and 8. A plane glass or metallic plate reflecting mirror 10 is held in stationary position and an opening 6a is formed in the sidewall of the cartridge 6 in opposed relation with the reflecting mirror or plate 10. A film gate 6b is formed in the front wall of the cartridge 6 in opposed relation with the film 9. Furthermore, the film pulldown mechanism (not shown) is disposed in the projector so that upon insertion of the film cartridge 6, an electric switch is automatically closed so that the pulldown mechanism is started while the projection lamp 3 is turned on.

When the cartridge 6 loaded with film 9 is inserted into the inserting opening 1a, the film pulldown mechanism is started as mentioned above, and the film 9 is intermittently driven. The light emanated from the projection lamp 3 is reflected by the reflecting mirror 10, thereby changing its optical path substantially by 90°, transmitting through the film 9, impinging into the projection lens 4, reflected by the stationary reflecting mirror 5 and being made incident upon the screen 2, thereby focusing the image. Thus, upon the screen 2 may be viewed the erect image.

We claim:

1. A cartridge type cine-projector comprising:
   a front panel having a first opening therein;
   a projection screen mounted in said first opening;
   a second opening formed in said front panel and spaced from said first opening;
   wall means formed integral with said second opening and extending inwardly into said cine-projector at an angle toward said screen, said angle in the range of 45° to 55° measured from the front panel between said second opening and said screen;
   a light source mounted within the cine-projector;
   a first mirror mounted at an angle within said cine-projector rearwardly of said screen;
   a cartridge containing film insertable into said second opening to be held within said wall means, said cartridge having an opening to receive the light from said source and a second mirror angularly mounted within said cartridge opposite said cartridge opening to direct the light through the film at substantially the angle of said wall means;
   a projection lens mounted within said cine-projector adjacent the inward termination of said wall means; and
   an image from the film being projected by the light through said lens onto said second mirror to be reflected onto said screen.

2. A cine-projector according to claim 2, in which the wall means has a length dimension extending to a predetermined depth, and the film cartridge has a dimension greater than said wall means dimension so that part of said cartridge projects out from said front panel when the cartridge is inserted.

3. A cine-projector according to claim 2, in which said cartridge opening is spaced further from said front panel than the inward end of said wall means when said cartridge is inserted.